US010247335B2

(12) United States Patent
Richter (10) Patent No.: US 10,247,335 B2
(45) Date of Patent: Apr. 2, 2019

(54) ELASTOMERIC EXPANSION JOINT PRE-FAILURE SENSOR AND METHOD

(71) Applicant: The Metraflex Company, Chicago, IL (US)

(72) Inventor: James R. Richter, Licolnshire, IL (US)

(73) Assignee: THE METRAFLEX COMPANY, Chicago, IL (US)

( * ) Notice: Subject to any disclaimer, the term of this patent is extended or adjusted under 35 U.S.C. 154(b) by 857 days.

(21) Appl. No.: 14/551,868

(22) Filed: Nov. 24, 2014

(65) Prior Publication Data

US 2016/0146394 A1 May 26, 2016

(51) Int. Cl.
| F16L 27/00 | (2006.01) |
| F16L 27/108 | (2006.01) |
| F16L 51/02 | (2006.01) |
| G01M 5/00 | (2006.01) |

(52) U.S. Cl.
CPC ......... F16L 27/1085 (2013.01); F16L 51/024 (2013.01); G01M 5/00 (2013.01)

(58) Field of Classification Search
CPC ...... F16L 27/108; F16L 27/1085; F16L 51/02
USPC .......................................... 285/93, 226, 229
See application file for complete search history.

(56) References Cited

U.S. PATENT DOCUMENTS

| 3,395,564 | A | * | 8/1968 | Rastrelli | G01B 7/18 338/2 |
| 3,845,657 | A | * | 11/1974 | Hall | G01L 1/2256 138/104 |
| 4,258,938 | A | * | 3/1981 | Davy | G01M 3/2861 285/229 |
| 4,446,747 | A | * | 5/1984 | Kamm | A24C 5/34 73/706 |
| 4,527,804 | A | * | 7/1985 | Spencer | F16J 15/004 174/11 R |
| 4,924,872 | A | * | 5/1990 | Frank | A61B 5/0215 600/486 |
| 5,154,083 | A | * | 10/1992 | Bernstein | G01L 7/02 29/447 |
| 5,222,769 | A | * | 6/1993 | Kaempen | B29C 70/207 138/128 |
| 5,273,321 | A | | 12/1993 | Richter | |
| 6,135,886 | A | * | 10/2000 | Armstrong | A63F 13/06 463/37 |

(Continued)

FOREIGN PATENT DOCUMENTS

WO    WO2015/147586    * 10/2015

OTHER PUBLICATIONS

Parker Remote Monitoring Program & Services, Jason Dunn.

*Primary Examiner* — Aaron M Dunwoody
(74) *Attorney, Agent, or Firm* — Greer, Burns & Crain, Ltd.

(57) ABSTRACT

An expansion joint including a hollow elastomeric body having coupling flanges at each open end configured to connect to flanges of a pipe system. The hollow elastomeric body is made of a material including an elastomer and fibers. A stretchable sensor is located within the material of the hollow elastomeric body. The sensor is configured to provide a varying electrical characteristic when the sensor is stretched or contracts. An analysis circuit is connected to the sensor, the analysis circuit configured to receive the varying electrical characteristic and to emit a signal corresponding to a level of the electrical characteristic received by the analysis circuit.

19 Claims, 5 Drawing Sheets

(56) References Cited

U.S. PATENT DOCUMENTS

| | | | |
|---|---|---|---|
| 6,588,804 B2* | 7/2003 | McGrath | F16L 51/035 |
| | | | 285/227 |
| 2008/0076995 A1* | 3/2008 | Hoarau | A61B 5/14552 |
| | | | 600/344 |
| 2008/0236271 A1* | 10/2008 | Zhang | E21B 33/1216 |
| | | | 73/152.48 |
| 2013/0312541 A1* | 11/2013 | Majidi | G01B 7/18 |
| | | | 73/862.454 |
| 2014/0081154 A1* | 3/2014 | Toth | A61B 5/6862 |
| | | | 600/479 |
| 2014/0130480 A1* | 5/2014 | Shipley | B29C 70/68 |
| | | | 60/253 |
| 2014/0238153 A1* | 8/2014 | Wood | G06F 3/011 |
| | | | 73/862.627 |
| 2014/0261944 A1* | 9/2014 | Papakonstantopoulos | |
| | | | B60C 5/14 |
| | | | 152/510 |

* cited by examiner

ELASTOMERIC EXPANSION JOINT PRE-FAILURE SENSOR AND METHOD

BACKGROUND OF THE INVENTION

The present invention relates to an elastomeric expansion joint, and in particular, to a sensor for determining a pre-failure condition of the elastomeric expansion joint.

Elastomer (rubber) expansion joints have been specified for many years to accommodate movement in piping runs and insure efficient systems. Elastomer joints are widely used to provide efficient ways to relieve movement stresses, reduce noise, isolate vibration, and compensate for misalignment.

A particular type of elastomer expansion joint is disclosed in U.S. Pat. No. 5,273,321, the disclosures of which are incorporated herein by reference.

Although elastomer expansion joints provide many advantages, over time the elastomeric material of the joint begins to weaken and stiffen or swell, eventually leading to failure of the joint by bursting of the joint.

Although joints could be proactively replaced in advance of failure based on a time-in-service measurement, oftentimes such a measurement results in premature replacement of the joint, at a substantial expense, not just for a new joint and the labor cost to make the replacement, but also due to down time for the piping system that the joint is a part of.

It would be an improvement in the art if there were provided a mechanism for determining an approaching failure condition of the expansion joint, sufficiently in advance of the failure time to allow for routine replacement of the joint, but not so far in advance as to be a premature replacement of a usable joint.

SUMMARY OF THE INVENTION

The present invention provides a mechanism for providing information about and determining an approaching failure condition of the expansion joint, sufficiently in advance of the failure time to allow for routine replacement of the joint, but not so far in advance as to be a premature replacement of a usable joint.

In an embodiment of the invention, there is provided an expansion joint comprising a hollow elastomeric body having coupling elements at each open end configured to connect to coupling elements of a pipe system. The hollow elastomeric body may be comprised of a material comprising an elastomer and perhaps strengthening fibers. A stretchable sensor is positioned within the material of the hollow body or attached to the interior or exterior of the hollow body. The sensor element has two spaced apart electrodes and an intervening element, the element configured to provide a varying electrical characteristic when the sensor stretches or contracts and an electrical potential is applied to the electrodes. An analysis circuit is connected to the electrodes, the analysis circuit configured to receive the varying electrical characteristic and to emit a signal corresponding to a level of the electrical characteristic received by the analysis circuit. This data may be collected and accessed and/or analyzed at a later time, or the data may be used to emit an alarm signal when a predetermined characteristic level is being received by the analysis circuit.

In an embodiment, the hollow elastomeric body is comprised of a plurality of alternating elastomeric and fiber layers superimposed one over the other and joined via a molding process at an elevated temperature and pressure. The sensor element may be positioned between any of the elastomer layers and fiber layers and, for example, may be positioned between an outermost elastomer layer and an outermost fiber layer.

The alarm signal may be at least one of an audible and a visible signal.

The analysis circuit may be configured to emit an alarm signal when the sensor the varying characteristic indicates that the elastomeric body has expanded to a predetermined circumference larger than an original circumference of the normal operating conditions for the expansion joint, indicating a weakening of the elastomeric material, or failing to expand to a predetermined degree upon the application of an increased pressure inside the elastomeric body, indicating a stiffening of the elastomeric material.

The invention may also comprise a method of pre-determining an approaching failure condition of a hollow elastomeric body expansion joint comprising the steps:

providing a stretchable sensor element on or within a material of the hollow elastomeric body, the sensor element having two spaced apart electrodes and an intervening element, the element configured to provide a varying electrical characteristic when the sensor stretches and contracts and an electrical potential is applied to the electrodes, applying an electrical potential to the electrodes, measuring a level of the electrical characteristic of the sensor element, and emitting a signal corresponding to a level of the electrical characteristic received by the analysis circuit.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures in which like reference numerals identify like elements, and in which:

DETAILED DESCRIPTION OF THE PREFERRED EMBODIMENTS

Figure 1:
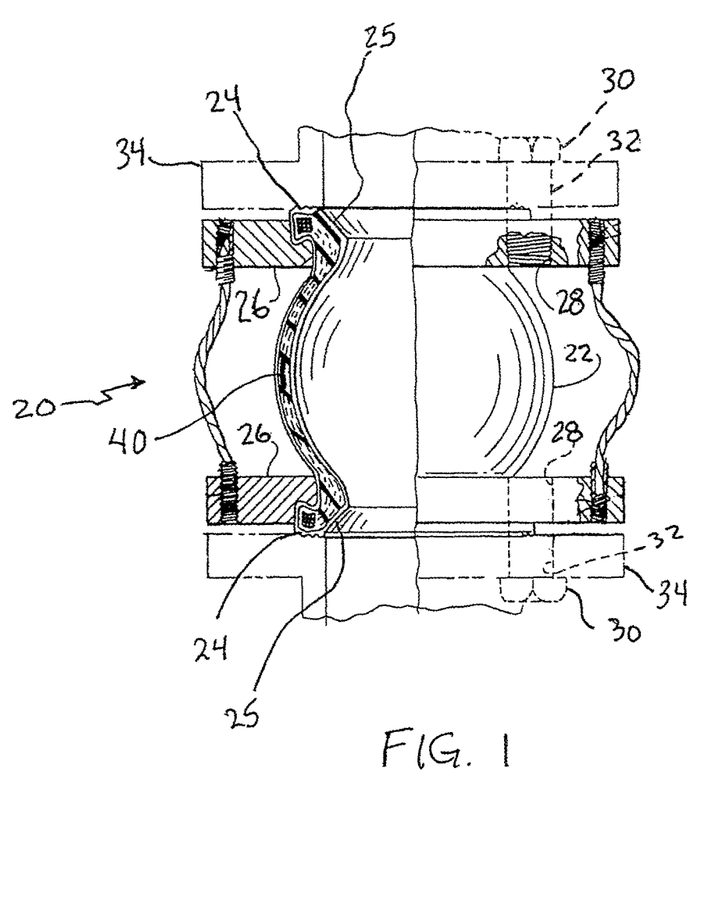
FIG. 1 is a side sectional and schematic view of an elastomeric expansion joint and associated circuitry embodying the principles of the present invention.
Figure 2:
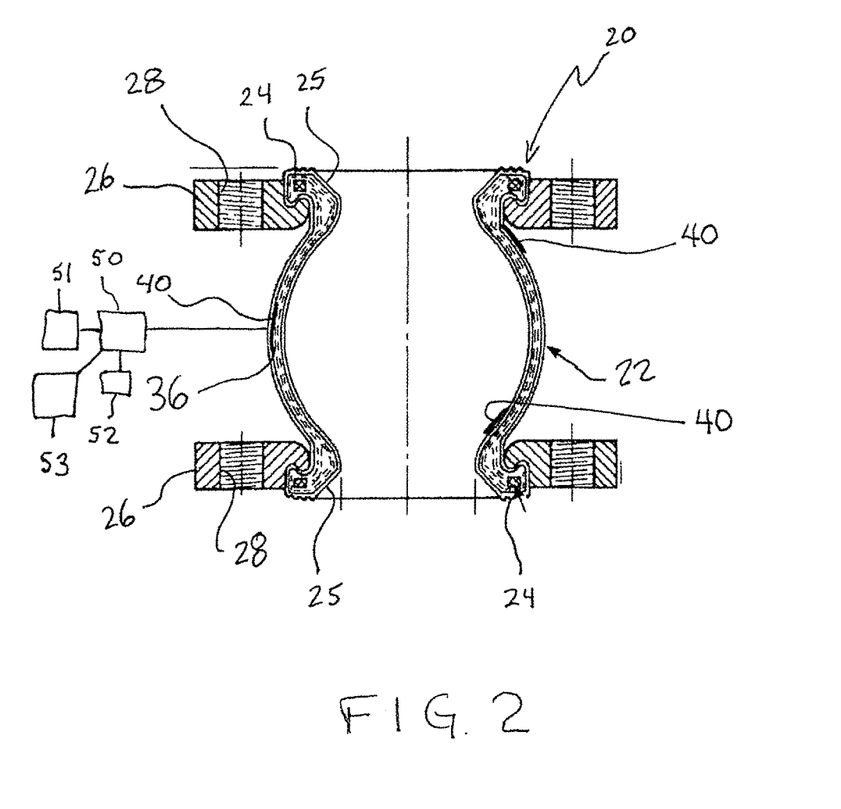
FIG. 2 is a side sectional and schematic view of a second embodiment of an elastomeric expansion joint and associated circuitry embodying the principles of the present invention.

FIG. 1 illustrates an elastomeric expansion joint 20 which is comprised of a fluid conductive flexible hollow body member 22 which may have a cylindrical or spherical shape with integral coupling elements 24, such as flanges, openings or other connectors, at each end adjacent openings 25 of the body member. Annular support members, such as coupling flanges 26, may be mounted on the opposite ends of the flexible body member 22 and held in place on the coupling elements 24. The coupling flanges 26 may be provided with a plurality of passages 28 suitable for receiving coupling bolts 30 which extend through passages 32 in flanges 34 of a piping system 36. Alternatively, the integral coupling elements 24 may have passages for receiving the coupling bolts 30. If the piping system 36 does not include flanges 34 at the open ends of the pipes, but instead uses different coupling elements, other coupling arrangements for the flexible body member 22 may be provided, as known in the art.

The flexible body member 22 is formed of a natural or synthetic elastomer, such as neoprene rubber, butyl rubber, nitrile rubber, ethylene propylene diene monomer (EPDM) rubber, Viton rubber, silicone rubber, polyurethane rubber, Buna rubber, Teflon polymer, polyvinyl chloride rubber or natural rubber, among others, which may be combined with various reinforcing fibers, such as bias-ply tire cord. In a particular embodiment, the flexible body member 22 may be formed by a built-up series of layers 36 (FIG. 3) of elastomer material 36A, 36C and fiber material 36B, or the elastomer material and fiber material may be mixed together. The material, mixed or in layers, may be inserted into a mold and heat and pressure applied to cure the elastomeric material to form the body member 22. The particular materials used and the method of fabricating the body member 22 are selected to best meet the requirements of the particular mechanical and/or chemical conditions and the temperature and pressure conditions to which the flexible connector 20 is to be subjected.

Figure 3:
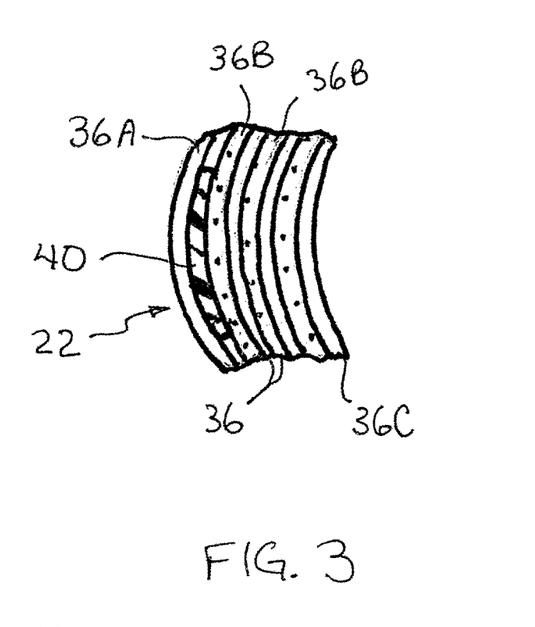
FIG. 3 is a partial sectional view of the elastomeric body with multiple sensors positioned between the layers of the material of the body.

At least one stretchable sensor 40 is provided on or within the material of the body member 22 or on the exterior or interior surface of the material. If the material of the body member 22 is a mixture of elastomeric material and fibers, the sensor 40 may be merely positioned below the outer surface of the material before the molding process is completed, so that the sensor will be molded in place within the body member 22. If the material of the body member 22 is comprised of alternating layers 36 of elastomeric material and fibers, the sensor 40 may be inserted between any two layers of elastomeric material and fibers, such as below the outermost layer 36A of elastomeric material and above the outermost layer of fiber 36B, so that the sensor will be covered by an elastomeric layer when the molding process occurs. Alternatively, the sensor 40 may be attached to the exterior or interior surface of the body member 22 such as by gluing or other attachment arrangements, such that the sensor will stretch and contract as the body member stretches and contracts.

Figure 4:
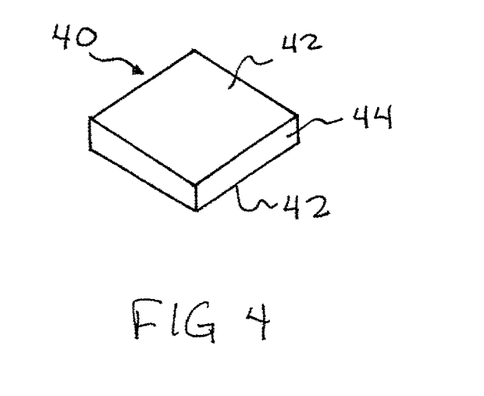
FIG. 4 is a perspective view of an embodiment of the sensor in isolation.

Each sensor 40 has two spaced apart electrodes 42 and an intervening element 44 (FIG. 4). The element 44 is configured to provide a varying electrical characteristic when the sensor 40 is stretched and an electrical potential is applied to the electrodes 44. The electrical potential may be applied via a direct wired connection to the electrodes 42, or by means of the formation of an electrical field that encompasses the sensor 40. If the electrical potential is applied via a direct wired connection, there may be provided short leads that extend out of the outer layer 36A to be later connected to appropriate electrical connectors or wires.

In an embodiment, the sensor 40 comprises as electroactive polymer (EAP) as the intervening element 44. The electrodes 42 and the intervening element 44 are resiliently stretchable, and stretch and contract as the material of the body member 22 stretches and contracts as the pressure of the fluid in the body member 22 changes.

As the sensor 40 stretches (contracts) along with the body member 22, its area increases (decreases) and an electrical characteristic, such as its capacitance, changes, such as by increasing (decreasing). A particular sensor 40 of this type is presently produced by Parker Hannifin Corp.

Figure 5:
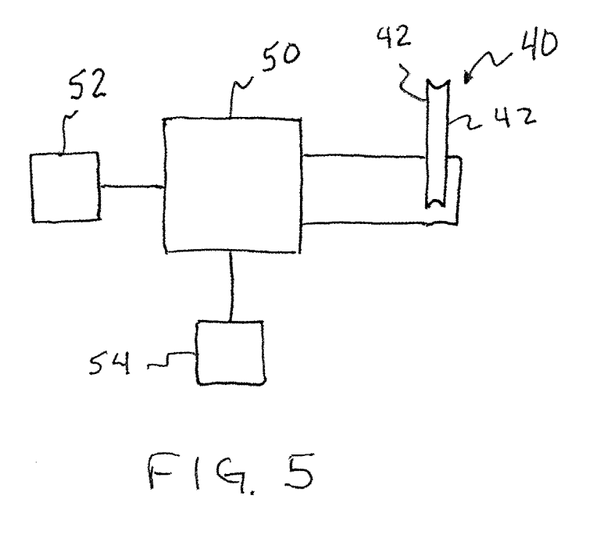
FIG. 5 is a schematic view of the sensor, analysis circuit and associated devices.

As shown in FIG. 5, an analysis circuit 50 is connected to the electrodes 42. The analysis circuit 50 is configured to receive the varying electrical characteristic of the sensor 40 and to emit a signal corresponding to a level of the electrical characteristic received by the analysis circuit. This data may be collected and stored in a memory unit 51 to be accessed and/or analyzed at a later time. The data may be used to emit an alarm signal via an alarm device 52 when a predetermined characteristic level is being received by the analysis circuit. The analysis may be a part of a computer or computer system 53, or may be connected to a computer or computer system that may be programmed to analyze the data collected and to determine whether to emit an alarm signal.

The alarm device 52 may be configured to provide either an audible alarm signal, such as the buzzing of a buzzer or blare of a horn, or a visual alarm signal such as the shining of a light. The alarm device 52 may also send a signal to another device 54, such as the computer or computer system 53, to terminate operation of any processes utilizing the piping system, or to provide a visible or audible signal at a computer terminal.

Figure 6:
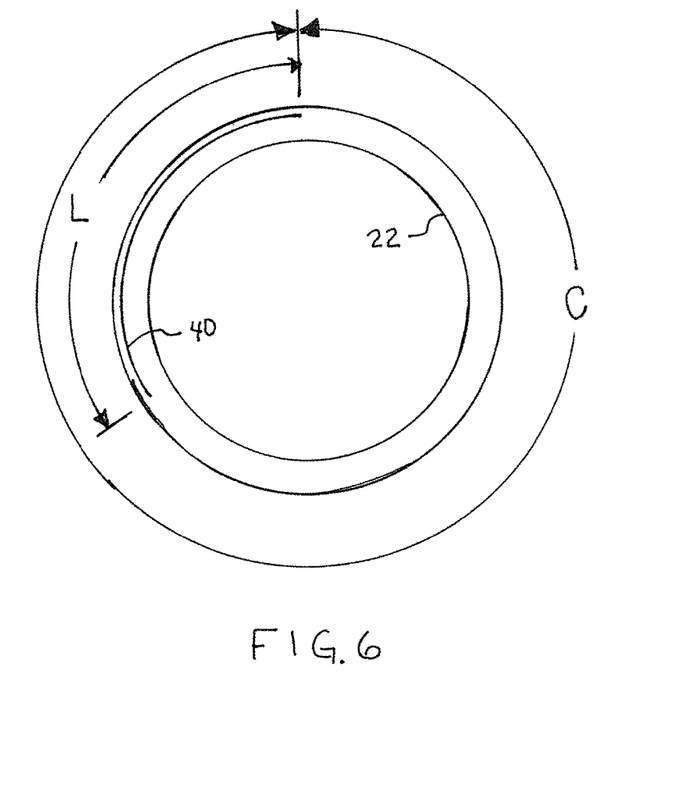
FIG. 6 is a sectional view through the elastomeric body showing the circumferential extent of the sensor in an embodiment of the invention.

As shown in FIG. 6, the sensor 40 has a length L which extends around at least a portion of a circumference C of the body member 22. For example, the length L of the sensor may extend around a quarter of the circumference C of the body member 22, or the length L of the sensor could be lesser or greater, and the length of the sensor could extend around the full circumference of the body member 22. In this manner, the sensor 40 will provide a signal that can be interpreted to be a measurement of the increase in the circumference or diameter of the body member 22.

Further, multiple sensors 40 may be placed at different locations on the body member 22 that may be subject to different stretches and aging characteristics. One or more sensors 40 may be located along a greatest circumference of the body member 22, while one or more sensors 40 may be located in various areas that may be subject to various stresses, such as in the neck areas or near the coupling elements 24 of the body member.

During normal operation of the body member 22, it will likely be subjected to the presence and/or flow of a pressurized fluid. Due to its elastomeric and resilient composition, the diameter and the circumference of the body member 22 will increase and/or decrease by a known or measurable amount during such normal operating conditions at the expected pressure and temperature of the fluid in the piping system 36.

However, as the body member 22 ages, and after a significant length of time, and depending in part on the conditions that the body member is exposed to, the integrity of the elastomeric material will begin to decline, causing the body member to expand to a greater degree at a given temperature and pressure of the fluid therein, or it may stiffen and fail to expand to a normal degree at a given temperature and pressure of the fluid. The sensor 40 and the analysis circuit 50 can detect this stretching and/or shrinking of the material of the body member 22. This information may be collected and analyzed to determine the status and/or condition of the body member 22. As mentioned above, multiple sensors 40 may be employed to provide information regarding the status of different portions of the body member 22.

Also, for example, the analysis circuit 50 can be configured to emit an alarm signal once the detected stretching of the material (as indicated by the varying electrical characteristic of the sensor 40) has reached a certain predetermined level. For example, the circumference C of the body member 22 at a predetermined temperature and pressure expected for the placement of the elastomeric expansion joint 20 can be used as a base line measurement. The analysis circuit can be configured to emit an alarm signal once the varying electrical characteristic reaches a level that would indicate an increase in the circumference of the body member 22 of a predetermined amount, for example, 120%, of the baseline measurement. The particular increase over the base line measurement for initiation of the alarm signal can be determined for a particular expansion joint 20 depending on the size of the body member 22, the material and construction of the body member and other experience determined factors. Also, if multiple sensors 40 are employed, different levels for triggering an alarm signal may used for sensors located at different positions on the body member 22, and the levels sensed may indicate either a greater or lesser stretching of the body member than would be normal for a given pressure and temperature of the fluid in the body member.

The invention thus provides for a method of pre-determining a failure condition of a hollow elastomeric body expansion joint 20 prior to an actual failure of the joint. Such a method would comprise the following steps:

Providing a stretchable sensor 40 on or within a material of the hollow elastomeric body 22. The sensor element may have two spaced apart electrodes 42 and an intervening element 44. The element may be configured to provide a varying electrical characteristic when the sensor 40 is stretched and an electrical potential is applied to the electrodes 42.

Applying an electrical potential to the electrodes 42.

Measuring a level of the electrical characteristic of the sensor 40.

Emitting a signal corresponding to a level of the electrical characteristic received by the analysis circuit.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An expansion joint comprising:
   a fluid conductive hollow elastomeric body having coupling elements in the form of flanges at each open end configured to connect with flanges at open ends of pipes of a pipe system,
   the hollow elastomeric body being comprised of a material comprising an elastomer,
   at least one stretchable sensor located on an exterior surface of the material of the hollow elastomeric body,
   the sensor having two spaced apart electrodes and an intervening element, the element configured to provide a varying electrical characteristic when the sensor is stretched or contracts and an electrical potential is applied to the electrodes, and
   an analysis circuit connected to the electrodes, the analysis circuit configured to receive the varying electrical characteristic and to emit a signal corresponding to a level of the electrical characteristic received by the analysis circuit.

2. The expansion joint of claim 1, wherein the elastomer of the hollow body comprises at least one of neoprene rubber, butyl rubber, nitrile rubber, ethylene propylene diene monomer (EPDM) rubber, Viton rubber, silicone rubber, polyurethane rubber, Buna rubber, Teflon polymer, polyvinyl chloride rubber and natural rubber.

3. The expansion joint of claim 1, wherein the coupling elements are integrally formed with the hollow elastomeric body.

4. The expansion joint of claim 1, wherein the hollow elastomeric body is comprised of a plurality of alternating elastomer and fiber layers superimposed one over the other and joined via a molding process at an elevated temperature and pressure.

5. The expansion joint of claim 1, wherein a plurality of sensors are located on the material of the hollow elastomeric body.

6. The expansion joint of claim 1, wherein the sensor element comprises an electroactive polymer.

7. The expansion joint of claim 1, wherein the varying electrical characteristic comprises an electrical capacitance of the sensor.

8. The expansion joint of claim 7, wherein the capacitance changes as the sensor stretches and contracts.

9. The expansion joint of claim 1, wherein the signal comprises at least one of an audible and a visible signal.

10. The expansion joint of claim 1, wherein the sensor comprises a length extending along at least one quarter of a circumference of the hollow elastomeric body.

11. The expansion joint of claim 1, wherein the analysis circuit is configured to emit an alarm signal when the varying characteristic indicates that the elastomeric body has expanded to a predetermined circumference larger than an original circumference of the normal operating conditions for the expansion joint.

12. An expansion joint comprising:
    a hollow elastomeric body having two open ends configured to connect to a pipe system,
    the hollow elastomeric body being comprised of a material comprising a plurality of alternating elastomer and fiber layers superimposed one over the other and joined via a molding process at an elevated temperature and pressure,
    at least one stretchable sensor located within the material of the hollow elastomeric body, positioned between an elastomeric layer and a fiber layer,
    the sensor configured to provide a varying electrical characteristic when the sensor stretches and contracts, and
    an analysis circuit connected to the electrodes, the analysis circuit configured to receive the varying electrical characteristic and to emit a signal corresponding to a level of the electrical characteristic received by the analysis circuit.

13. The expansion joint of claim 12, wherein the elastomer of the hollow body comprises at least one of neoprene rubber, butyl rubber, nitrile rubber, ethylene propylene diene monomer (EPDM) rubber, Viton rubber, silicone rubber, polyurethane rubber, Buna rubber, Teflon polymer, polyvinyl chloride rubber and natural rubber.

14. The expansion joint of claim 12, wherein the varying electrical characteristic comprises an electrical capacitance of the sensor.

15. The expansion joint of claim 12, wherein the signal is at least one of an audible and a visible signal.

16. The expansion joint of claim 12, wherein the sensor comprises a length extending along at least one quarter of a circumference of the hollow elastomeric body.

17. An expansion joint comprising:
a hollow elastomeric body having coupling elements in the form of flanges at each open end configured to connect with flanges at open ends of pipes of a pipe system,
the hollow elastomeric body being comprised of a material comprising a plurality of alternating elastomer and fiber layers superimposed one over the other and joined via a molding process at an elevated temperature and pressure,
at least one stretchable sensor located within the material of the hollow elastomeric body, positioned between an elastomeric layer and a fiber layer,
the sensor having two spaced apart electrodes and an intervening element, the element configured to provide a varying electrical characteristic when the sensor is stretched or contracts and an electrical potential is applied to the electrodes, and
an analysis circuit connected to the electrodes, the analysis circuit configured to receive the varying electrical characteristic and to emit a signal corresponding to a level of the electrical characteristic received by the analysis circuit.

18. The expansion joint of claim 17, wherein the coupling elements are integrally formed with the hollow elastomeric body.

19. The expansion joint of claim 1, wherein the sensor is located on an interior surface of the hollow elastomeric body.

* * * * *